United States Patent [19]

Johnson

[11] Patent Number: 4,534,416
[45] Date of Patent: Aug. 13, 1985

[54] AUTOMATIC LOCK FOR FARM EQUIPMENT TRANSPORT WHEEL

[75] Inventor: Terry L. Johnson, Brillion, Wis.

[73] Assignee: Beatrice Foods Co., Chicago, Ill.

[21] Appl. No.: 548,963

[22] Filed: Nov. 7, 1983

[51] Int. Cl.³ .............................................. A01B 63/22
[52] U.S. Cl. .................................. 172/311; 172/413; 172/466
[58] Field of Search .............. 172/311, 446, 456, 466, 172/662, 776, 240, 383, 384, 386, 413

[56] References Cited

U.S. PATENT DOCUMENTS

| 2,704,021 | 3/1955 | Brundage | 172/466 X |
| 3,463,241 | 8/1969 | Essex | 172/456 X |
| 3,470,965 | 10/1969 | Quickstad | 172/456 X |
| 3,481,408 | 12/1969 | Twidale | 172/456 X |
| 3,897,832 | 8/1975 | Leedahl et al. | 172/776 X |
| 4,346,763 | 8/1982 | Swanson et al. | 172/2 |
| 4,360,067 | 11/1982 | Schaaf | 172/413 |
| 4,446,925 | 5/1984 | Vachon | 172/413 X |

Primary Examiner—Richard J. Johnson
Attorney, Agent, or Firm—Bayard H. Michael

[57] ABSTRACT

Movement of a wing frame to folded position moves a locking member into position to be engaged by the arm which actuates the wheels to lowered position. When engaged, the lock prevents the wheels from being raised. To disengage the lock the wing must be unfolded first to enable the locking lever to rise out of the way when the arm is actuated to disengage the lock. The entire operation is controlled hydraulically and the farmer need not get off his tractor to lock or unlock the rig.

14 Claims, 21 Drawing Figures

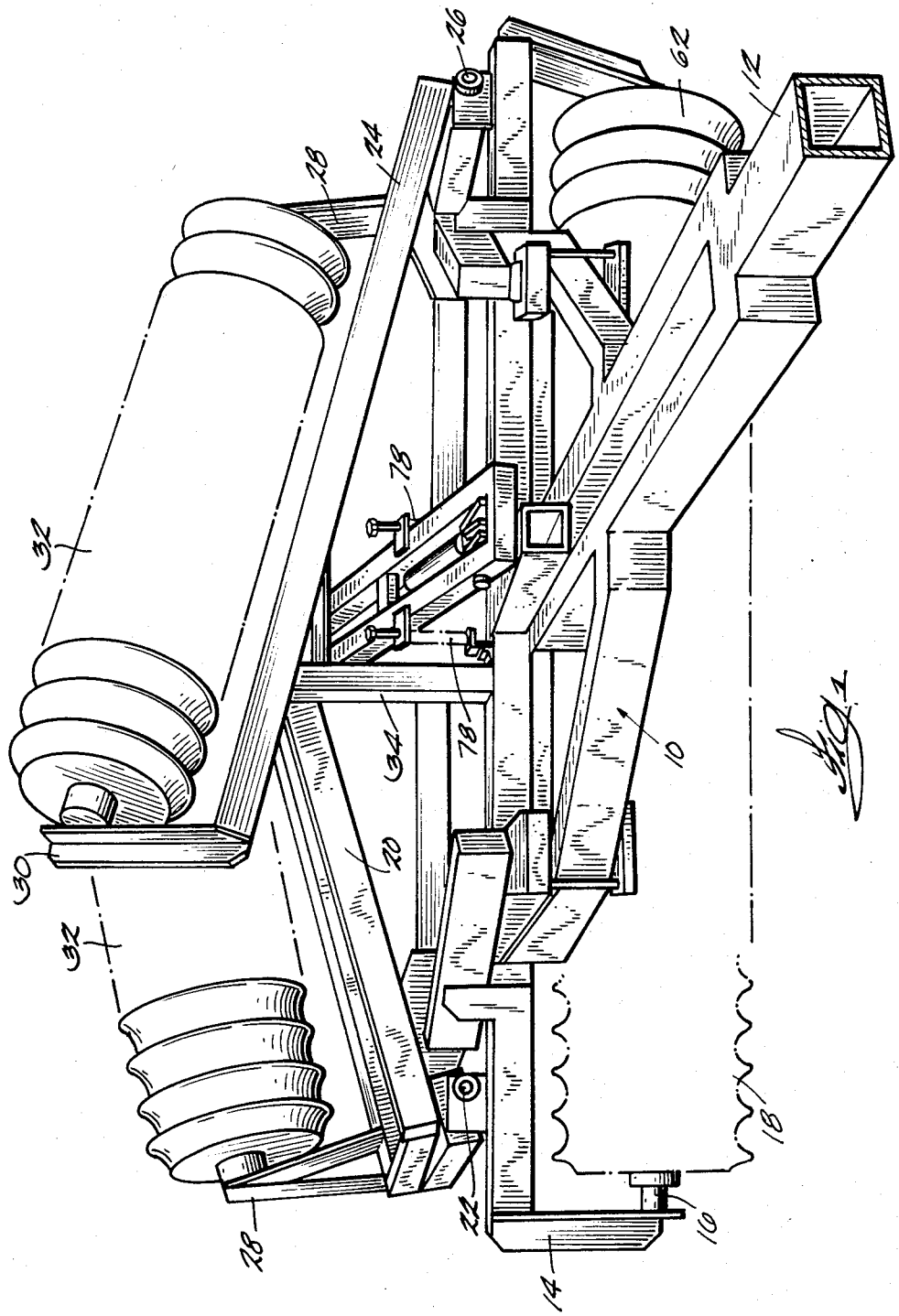

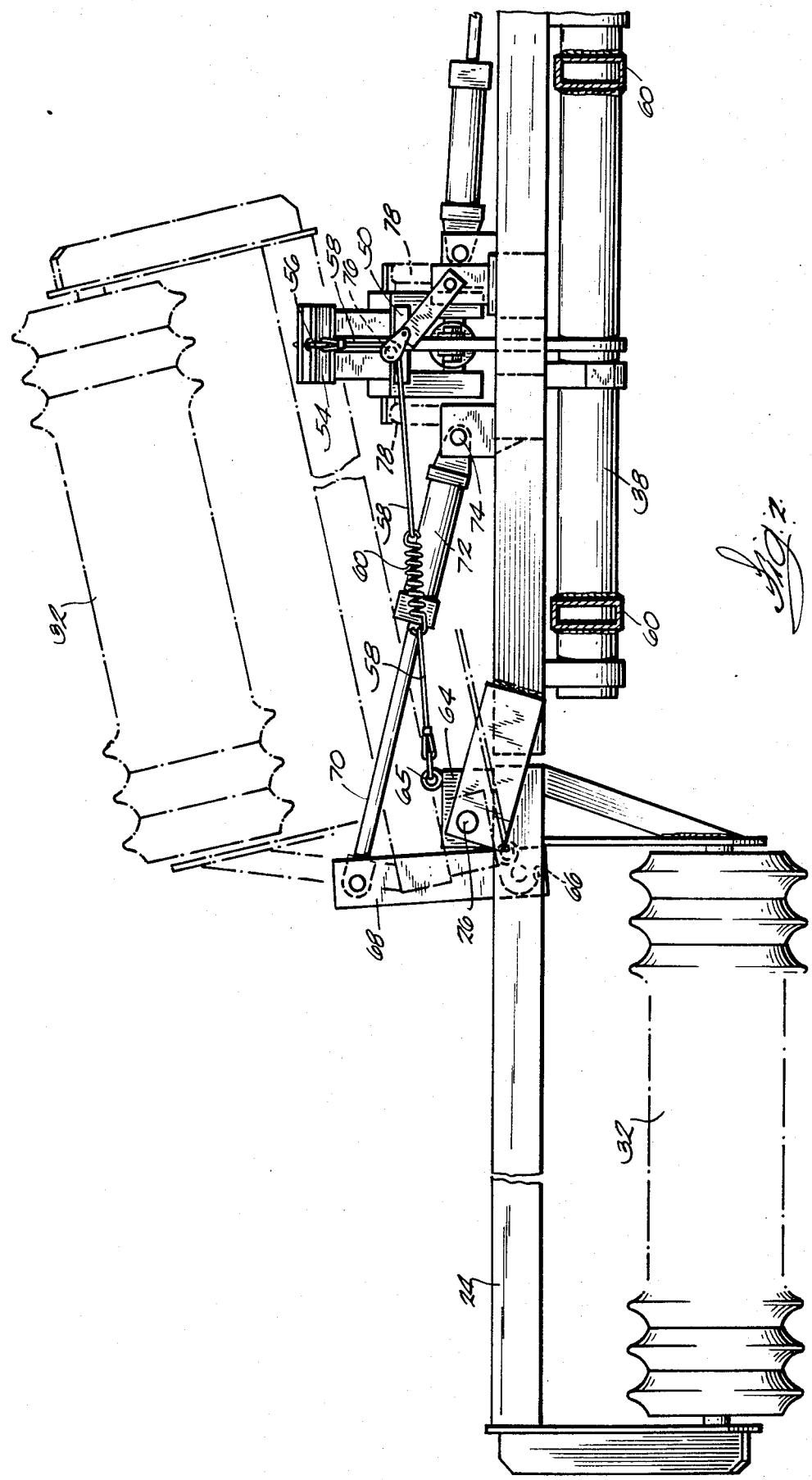

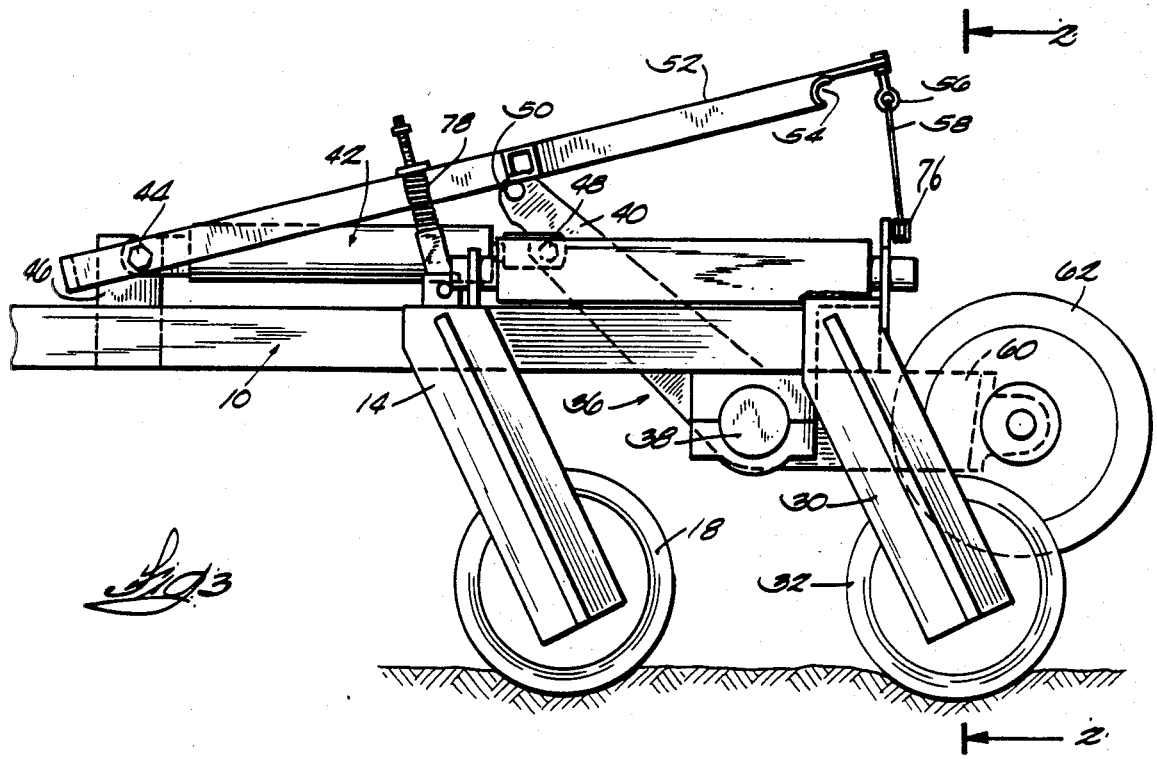
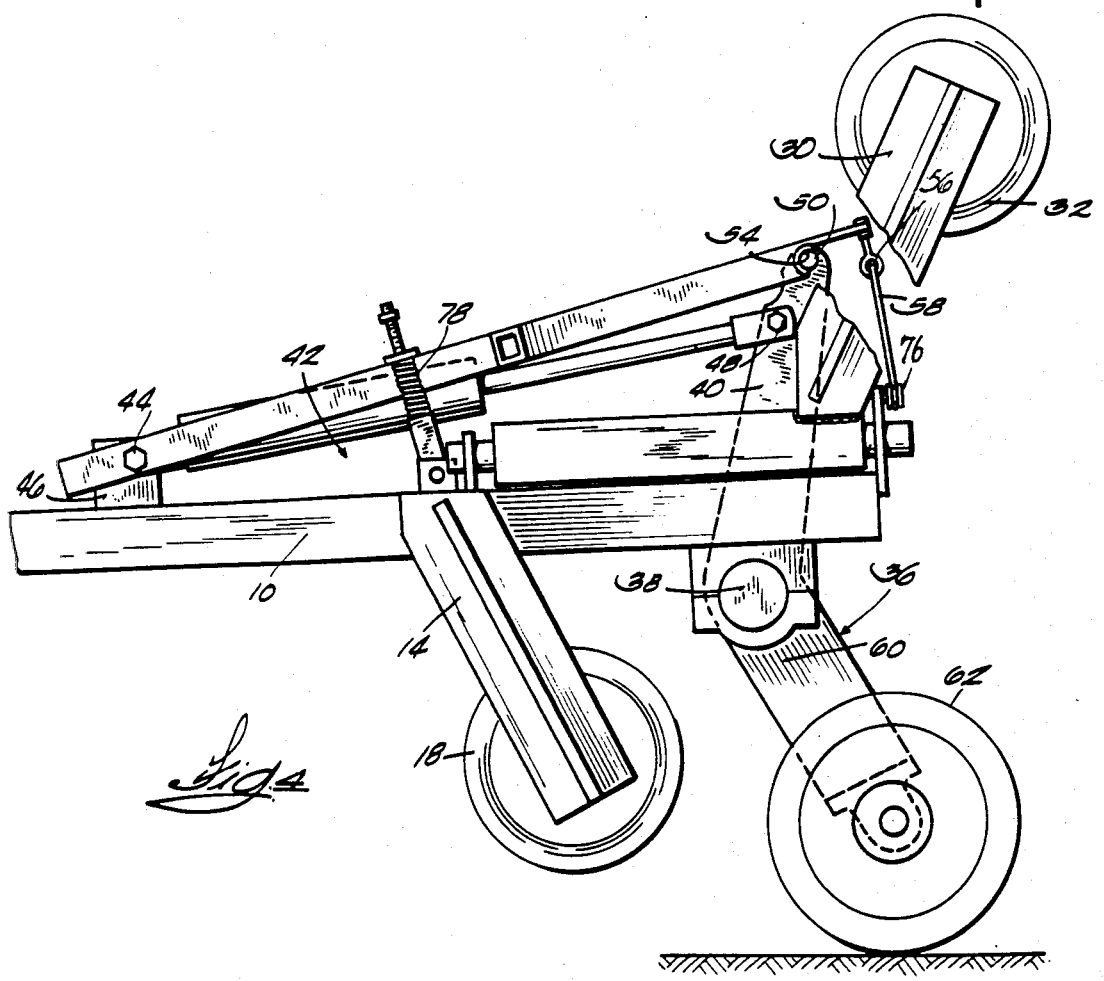

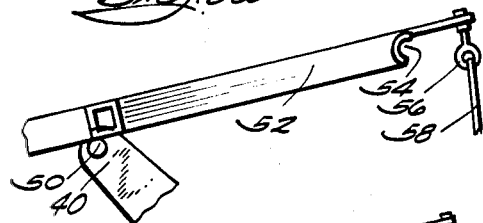
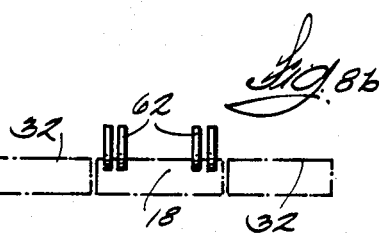
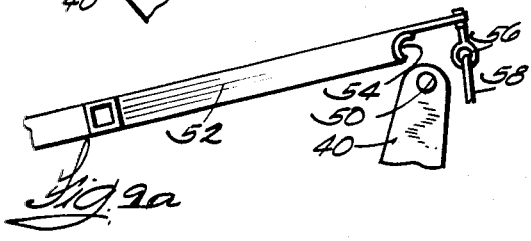
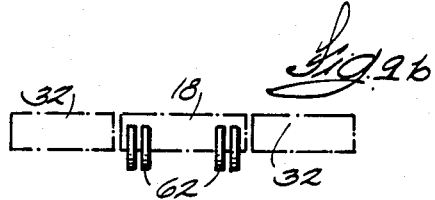
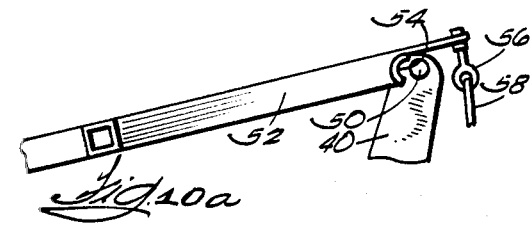
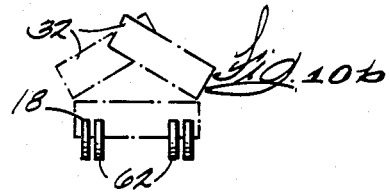
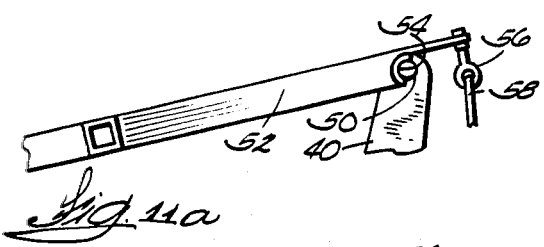
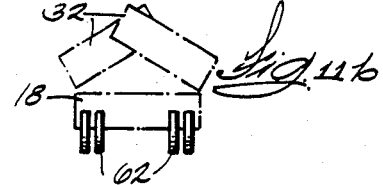
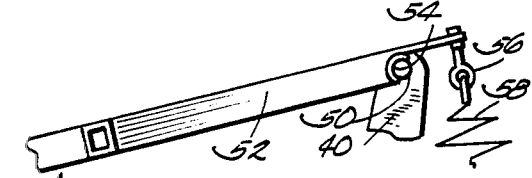
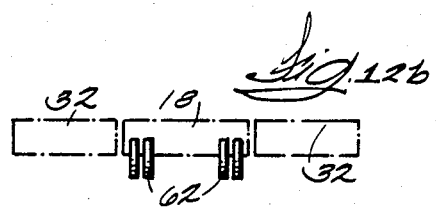
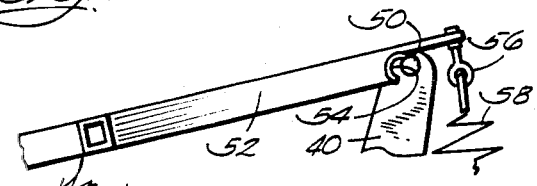
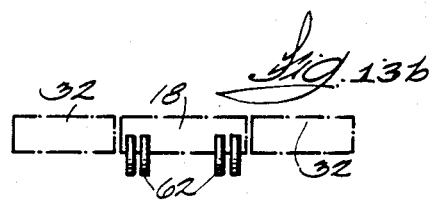
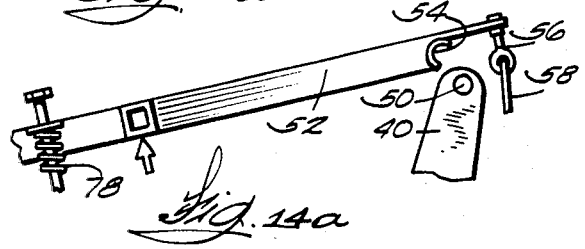
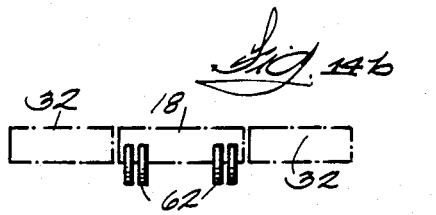

AUTOMATIC LOCK FOR FARM EQUIPMENT
TRANSPORT WHEEL

BACKGROUND OF THE INVENTION

Various types of farm equipment have a center section or frame provided with wheels which can be hydraulicly lowered to raise the frame for transportation over the road. The wheels are later raised to allow the equipment to rest on the ground for use. The frame is usually provided with wings which fold out to either side of the center section to greatly increase the width of the equipment in field use. These wings are hydraulicly folded back over the center section to reduce the width of the equipment when being transported over the highway.

Up to now the operator has been required to get off his tractor and go back to the equipment to lock the equipment in the folded (raised) position prior to going on the highway. This is done to avoid risk of damage to the equipment should a hydraulic line break and result in the equipment dropping. When the farmer gets to the field, he then has to go back to the equipment to release the lock to allow the equipment to be lowered.

SUMMARY OF THE INVENTION

The ooject of this invention is to provide means for locking the farm equipment in the raised transport position and for subsequently unlocking the equipment all without having to get off the tractor.

Another object of this invention is to provide for actuation of the hydraulic ram which raises and lowers the wheel(s) (lowers and raises the center section) and the rams which fold the wings from a common pressure source while assuring proper sequencing to lock and unlock the implement in the transport position. With this arrangement the wheels are lowered first when going to the transport position and are raised last when going to the field position.

A further object is to provide a lock member actuated to an active position by a wing going to its folded position. With such an arrangement the wheels can be locked in the transport position only when the wing is folded. The lock cannot be unlocked until the wing is unfolded.

BRIEF DESCRIPTION OF THE DRAWINGS

FIG. 1 is a perspective view from the end of the farm implement showing the wings or side frames folded over the center section for transportation over the highway.

FIG. 2 is an elevation taken from the rear of the implement along the line 2—2 in FIG. 3. This view shows the left-hand wing in the field position and folded to the transport position.

FIG. 3 is a partial side elevation of the implement with the center and wing soil working tools in contact with the ground and the transport wheel raised. This is the field position.

FIG. 4 is similar to FIG. 3 but shows the wheels in contact with the ground which lifts the center section tools off the ground. In this view the wing is shown folded.

On the sheet of drawings including FIGS. 8–14, the left and right column of figures constitute paired scnematic drawings with each pair depicting a stage of the operation. Thus, FIGS. 8a and 8b go together and illustrate the relationship of the locking lever and the actuating arm when the center section and wings are in the field position. FIG. 9 shows the wheels down and the actuating arm advanced to its extreme position. FIG. 10b shows the wings folded resulting in the locking lever being pulled down as shown in FIG. 10a to be locked as in FIG. 11a. This is the transport position. When returning to the field position, the wings are first unfolded as shown in 12b and the locking lever and arm are still engaged as shown in 12a. In 13a the lever is released from the arm by moving the arm to its extreme position. This permits the lever to rise to the elevated position shown in 14a.

DETAILED DESCRIPTION OF THE DRAWINGS

Figure 5:
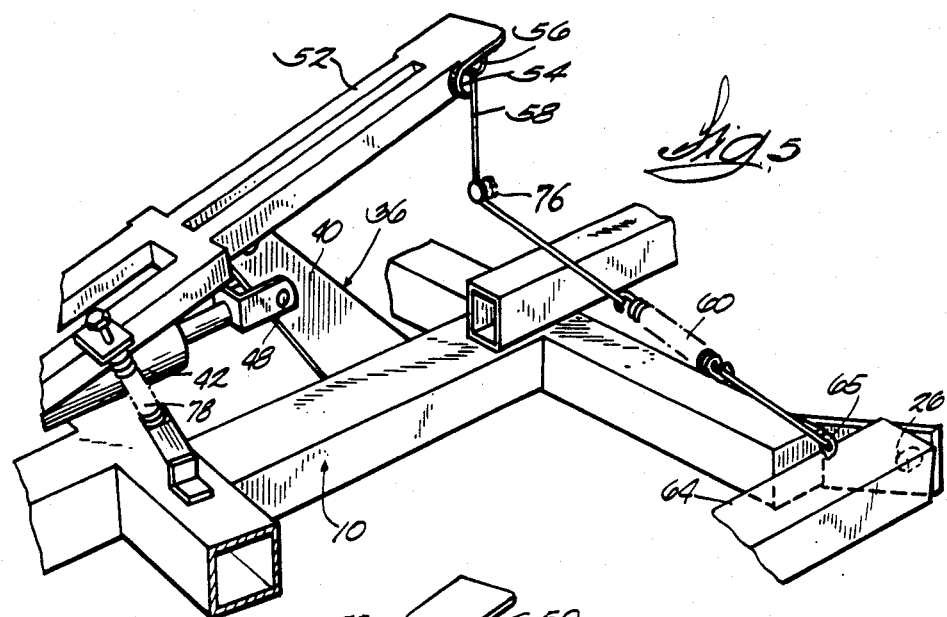
FIG. 5 is a partial perspective view showing the relationship of the lock lever, the actuating arm and the cable connecting the wing to the lock lever. The parts are shown in their positions when the wheels are elevated in field position.

The main frame or central section 10 of the implement has a drawbar 12 which is connected to a tractor. The central section has an arm 14 depending from each side of the frame to support the axle 16 for the soil working tools 18, typically pulverizers. A side frame or wing is mounted on each side of the main frame. In FIG. 1 wing 20 is pivoted on shaft 22 which is set at an angle to the frame to allow the wing to fold in with a scissor action relative to the other wing frame 24 mounted on shaft 26 on the right side of FIG. 1. Each of these wing frames has inner and outer supports 28, 30 for the pulverizers 32. Each wing frame is provided with a support leg 34 positioned to engage the center frame when the wing is folded to the transport position (FIG. 1). When the wings are swung out to their laterally extended positions the support legs 34 project up in the air.

When the left wing is folded out as seen in solid lines in FIG. 2, the pulverizer 32 will engage the ground as does the center pulverizer 18. The center section is provided with a pivoted wheel assembly which includes a crank 36 pivoted on trunion 38. The crank has an arm 40 actuated by the hydraulic ram 42 having its cylinder end connected by pin 44 to bracket 46 and its piston rod connected at 48 to the arm. The upper end of the arm is provided with a transverse lock pin 50. Lock lever 52 is pivoted on bolt 44 and has a C-shaped keeper 54 at its free end inwardly of anchor 56 for cable 58. The bell crank 36 has arms 60 supporting wheels 62 which are elevated in FIG. 3 to enable the pulverizer to engage the ground. When the ram 42 is actuated to drive the piston to the right in FIG. 3, the arm 40 will be rotated clockwise to move wheels 62 down into engagement with the ground. This causes the main frame and the wings to lift up off the ground.

After the central section has been elevated, the wings are folded over the central section to reduce the width of the implement as it travels over a road. As previously indicated, the wings are pivoted on shafts 22 and 26. Now considering just the left-hand wing 24 (and this is considered from the rear of the implement), the wing pivots on shaft 26. The wing frame includes a box beam 64 having a cable anchor 65 near the rear of the frame. The beam also has ears 66 fixed thereon. Link 68 is pivotally connected to the ears and to the piston rod 70 which is part of hydraulic ram 72 pivotally connected to the center frame at 74. When hydraulic pressure is applied to the ram 72 to drive the piston to the right, it will cause the link 68 to pivot into engagement with the box beam 64 and rotate the beam around shaft 26. This rotation will continue for almost 180° and end up with the wing folded to the dotted line position shown in FIG. 2. It is to be noted that the cable anchor 65 on the box spring rotates from a position up and right of pivot 26 to a position below and left of pivot 26, all as shown in FIG. 2. Cable 58 is anchored at 65 and has a tension spring 60 in the system to allow overtravel. It will be obvious that the cable is moved a substantial distance when the left wing folds for transport.

Figure 6:
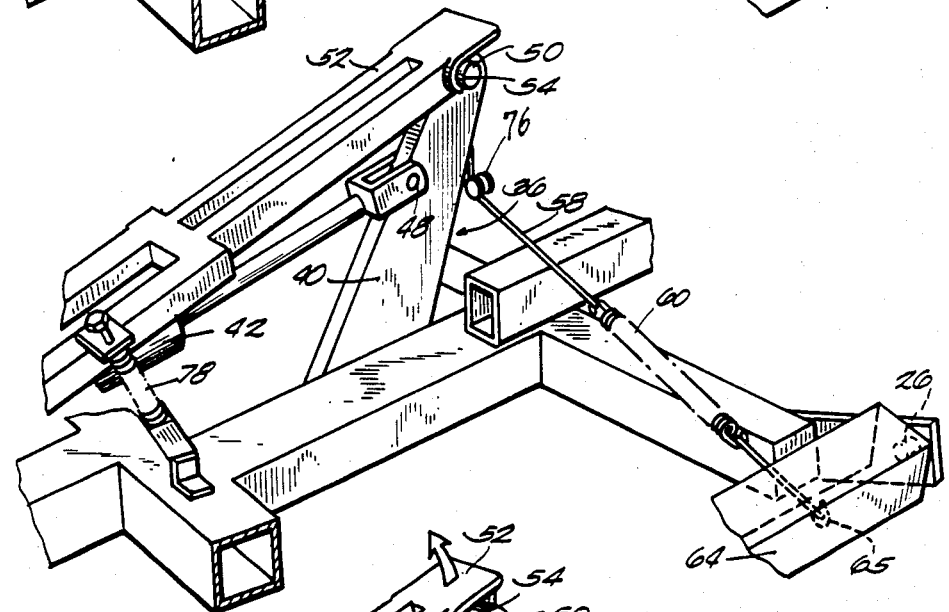
FIG. 6 is similar to FIG. 5, but shows the parts in the position they occupy for transport with the wheels locked in the down position.

In the field position shown in FIG. 5, the cable is tight with compressed springs 78 biasing the lock lever 52 upwardly to take up slack in the cable. The cable is turned on a fixed pulley 76. When the ram 42 is actuated to move the arm 40 to the wheel down or transport position shown in FIG. 6, the box beam 64 rotates to draw the cable 58 tight and stretch spring 60 while pulling the end of lock lever 52 down against pin 50. If the hydraulic pressure is reversed momentarily, the lock pin 50 is driven back into the keeper 54, as shown in FIG. 6. Obviously, spring 60 is stronger than the combined force of the two springs 78 biasing the lock lever 52 upwardly. Therefore, the lock lever is held down.

Figure 7:
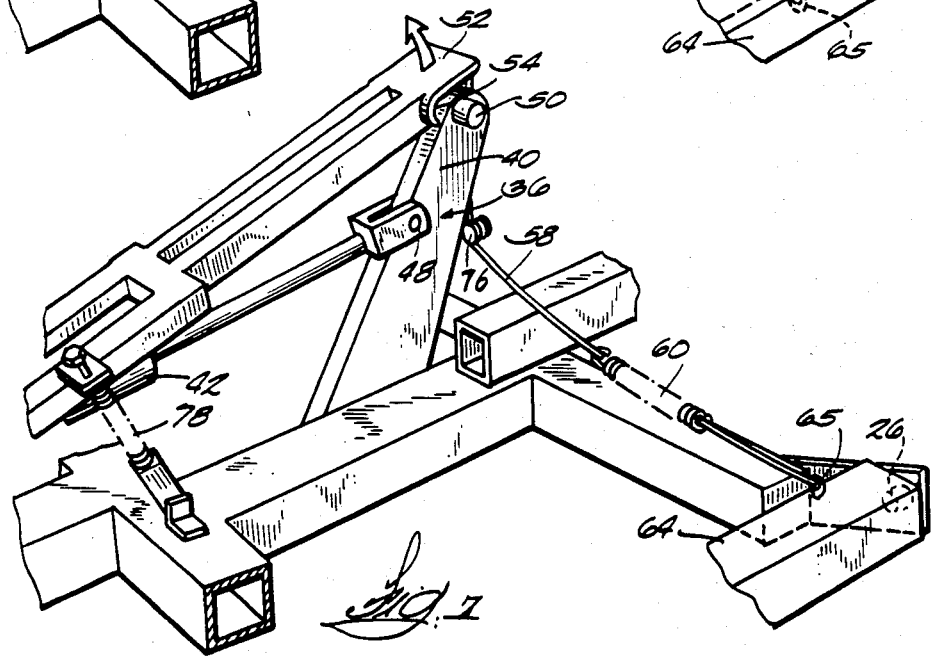
FIG. 7 is taken from the same angle as FIGS. 5 and 6 but shows the release of the lock after the wings nave been unfolded to the field position.

In order to disengage the lock pin from the keeper it is necessary to not only move the pin to the right from the FIG. 6 position, but it is also necessary to slacken the cable to allow springs 78 to push lever 52 upwardly as illustrated in FIG. 7. In order to do this the wing frame beam 64 has to be rotated back to its position shown in FIG. 7 (the wing is unfolded) at which time the cable 58 goes slack. Pushing the arm lever 40 to the right with the cable slack will disengage pin 50 from keeper 54 and springs 78 can push the lever up. When hydraulic pressure is then reversed the lever is moved to the left in FIG. 7 without reengaging the keeper.

The hydraulic rams are designed to be operated from a single hydraulic circuit on the tractor. Tractors usually have multiple circuits and two circuits could be used but without advantage. With a single circuit the system is controlled to give the proper sequence simply because the ram which offers the least resistance will move first. Thus, with the parts in the field position actuating the valve on the tractor to the transport position will cause the wheel to be lowered to raise the center section since that is easier (requires less pressure) than folding the wings. When the actuating arm has been moved to its extreme position, the pressure will build up in the wing rams to fold the wings. When they pass over center and tend to lower themselves, the required pressure drops. When the left wing is fully folded, it pulls the lock lever down by means of the cable interconnection. Now the hydraulic control lever is actuated to reverse the pressure in the system. The wheel wants to be raised since the weight of the entire rig is urging the wheel in that direction. So, even though the wing rams were last actuated, the wheel ram will be actuated due to the need for less force. This drives the lock pin into the keeper on the lock lever. That keeps the wheel from being raised. The implement is ready for transport.

When the hydraulic lever is actuated to raise the wheel the lock prevents such movement and the wing rams go into action to unfold the wings. This will allow the cable to go slack. When the wings are unfolded, the hydraulic lever is actuated to momentarily apply pressure to lower the wheel. This drives the lever to its extreme position which takes the lock pin out of the keeper. The lock lever biasing springs can then lift the lock lever clear of the pin. Then the hydraulic pressure is reversed to raise the wheel.

It will be apparent that the lock is enabled by folding the wings last and that is the natural sequence of the hydraulic control. The lock requires the hydraulics to unfold the wings first and that enables the lock to be released. This sequencing is obtained with no exotic hydraulic controls.

The sequence of operation going from field use to transport position and back to field position is shown schematically in FIGS. 8–14. In FIG. 8b the wheels are shown elevated and in FIG. 8a the lock lever 52 is pushed up by the compressed springs 78 and the arm 40 is shown in its retracted (wheel up) position. When pressure is applied to the system, the piston requiring the least force will be the wheel actuating ram 42. Therefore, arm 40 will move to the right in FIG. 9a. This lowers the wheels as shown in FIG. 9b. No further movement can occur in the wheel actuating ram. Therefore the pressure builds up and folds the wings, as illustrated in 10b. When the left-hand wing folds into place it pulls on the cable 58 to pull lock lever 52 down against the lock pin 50, but the pin is too far to the right to be engaged by the keeper 54. Therefore, the hydraulics are reversed momentarily to move the arm 40 to the left as shown in FIG. 11a where the pin 50 engages the keeper 54. Now the lock lever is operative to prevent the wheels from collapsing under the rig even if hydraulic pressure fails.

When it is desired to unfold the wings, the control lever on the tractor is operated to reverse the pressure from that used in lowering the wheels. The wheels can't move, however, even though that would be the course of least resistance were it not for the lock. With the lock operative, the pressure has to go to the wing rams to unfold the wings, as shown in 12b. The lock remains engaged as shown in 12a. With the wings down the cable goes slack (FIG. 12a). Springs 78 acting on the arm 40 want to push the lock lever 52 up but the keeper prevents that from happening (FIG. 12a). Therefore, the pressure is reversed momentarily to drive the arm to the right as shown in FIG. 13a to disengage the lock pin from the keeper (FIG. 13a). Since the cable is slack the springs 78 acting on the lock lever 52 can now push the lever 52 up to the position shown in FIG. 14a. This frees the lock arm 52 for movement to the left (counter-clockwise) to raise the wheels and put the rig back on the ground ready for use.

I claim:

1. In a tractor-drawn farm implement of the type having a main frame, soil working tools mounted on said frame, a wheel assembly pivotally mounted on said frame and including a wheel and an actuating arm, means for actuating said arm to move said wheel between a raised field position in which said tools contact the ground and a transport position in which the wheel engages the ground and said tools are raised from the ground, a wing frame pivoted on said main frame for pivotal movement between a laterally extended position and a folded position in which the wing frame has pivoted inwardly at least 90° from said extended position, soil working tools mounted on said wing frame, means for actuating said wing frame between its positions, the improvement comprising, a separate releaseable lock member engageable with said arm, means responsive to movement of said wing frame to said folded position to move said lock member into a lock position in which it is engageable with said arm.

2. An implement according to claim 1 in which said lock member is pivoted on said frame for movement to and from said lock position, and including means biasing said lock member away from said lock position.

3. An implement according to claim 2 in which said arm can be moved to an extreme position slightly beyond the position in which it is engageable by said lock member to enable said lock member to move to said lock position, said arm being moved back from said extreme position after said lock member has reached said lock position to engage said lock member with said arm.

4. An implement in accordance with claim 3 in which said lock member includes a keeper having an open entry, and said arm includes a pin which enters said entry when said arm is moved back from said extreme position, said pin being captured by said keeper until said wing frame is moved from said folded position to enable said biasing means to move said lock member away from said lock position, said pin remaining in said keeper until said arm is actuated to said extreme position.

5. An implement in accordance with claim 4 in which said means for actuating said arm is a first hydraulic ram and said means for actuating said wing frame is a second hydraulic ram, and including means for actuating said first ram first when changing the implement from field position to transport position and for actuating said first ram last when changing the implement from transport position to field position.

6. In a tractor-drawn implement of the type having a center frame having soil working tools mounted thereon, a wheel assembly pivoted on said frame, said assembly including a wheel and an actuating arm, a hydraulic ram for actuating said arm to move said wheel from a field position in which the wheel is out of contact with the ground and said tools contact the ground to a transport position in which the wheel contacts the ground and the tools are raised out of contact with the ground and to an extreme position in which the arm is slightly beyond said transport position, a wing frame pivotally mounted on each side of the central frame for pivotal movement between a field position in which the wing frame extends to the side of the central frame and a folded position in which the frame has pivoted at least 90° from the field position, soil working tools on each wing frame, hydraulic means for moving said wing frames, the improvement comprising, means controlling said hydraulic ram and said hydraulic means so said hydraulic ram is actuated first when changing from field position and the wheel assembly is moved to said extreme position, said control means actuating said hydraulic means first when changing from said transport position to unfold said wing frames to their field positions before moving said wheel to field position, a lock member engageable with said arm, means responsive to movement of a wing frame to said folded position to move said lock member into a lock position in which it is engageable with said arm.

7. An implement according to claim 6 in which said arm is engaged by said lock member when the arm is moved from said extreme position to said transport position after said lock member has been moved to said lock position.

8. An implement according to claim 7 including a pin on said arm, said lock member including a keeper having an open entry facing said pin, said pin entering said entry for retention by said keeper when the arm is moved from said extreme position to said transport position.

9. An implement according to claim 8 including means biasing said lock member away from said lock position, said means responsive to movement of said wing frame being operative to release said lock member for movement under influence of said biasing means when said wing frame is unfolded, said pin engaging said keeper acting to prevent movement of said lock member by said biasing means until said arm is actuated to said extreme position to withdraw said pin from said keeper.

10. An implement according to claim 9 in which said control means prevents actuating said ram to move said arm to withdraw said pin until the wing frames have been unfolded.

11. An implement according to claim 10 in which said control means comprises a common supply of hydraulic fluid under pressure to said ram and said hydraulic means so the device requiring the least force is the first to be actuated, said lock member engaging said arm being operative to prevent the normally easier return of the wheel to field position to thereby force unfolding of the wing frames first.

12. An implement according to claim 11 in which said means responsive to movement of said wing frame to folded position prevents movement of said lock member under influence of said biasing means if said hydraulic ram is actuated to move said arm to said extreme position before said wing frame is unfolded.

13. An implement according to claim 6 in which one of said wing frames has an anchor which moves about the wing pivot and which moves further from the centerline of the center frame when the wing is folded, said means responsive to movement of a wing frame comprising a cable connected to said anchor and to said lock member to pull the lock member to said lock position when the wing is folded.

14. An implement according to claim 13 including a spring in said cable connection, spring means biasing said lock member away from said lock position, said spring exerting greater force than said spring means.

* * * * *